(12) United States Patent
Song

(10) Patent No.: US 12,547,675 B2
(45) Date of Patent: Feb. 10, 2026

(54) METHOD AND DEVICE FOR MANAGING DATA LICENSE IN M2M SYSTEM

(71) Applicants: Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 185 days.

(21) Appl. No.: 18/279,368

(22) PCT Filed: Apr. 12, 2022

(86) PCT No.: PCT/KR2022/005299
§ 371 (c)(1),
(2) Date: Aug. 29, 2023

(87) PCT Pub. No.: WO2022/244987
PCT Pub. Date: Nov. 24, 2022

(65) Prior Publication Data
US 2024/0134944 A1    Apr. 25, 2024
US 2024/0232298 A9    Jul. 11, 2024

Related U.S. Application Data

(60) Provisional application No. 63/189,279, filed on May 17, 2021.

(51) Int. Cl.
*G06F 21/10* (2013.01)

(52) U.S. Cl.
CPC .......... *G06F 21/10* (2013.01); *G06F 21/1064* (2023.08); *G06F 21/107* (2023.08)

(58) Field of Classification Search
CPC ..... G06F 21/10; G06F 21/107; G06F 21/1064
See application file for complete search history.

(56) References Cited

U.S. PATENT DOCUMENTS

2008/0097879 A1*  4/2008  Sadowski ............ G06Q 20/24
                                                         705/35
2013/0152217 A1    6/2013  Park
(Continued)

FOREIGN PATENT DOCUMENTS

KR    10-2010-0070763 A    6/2010
KR       10-1274966 B1     7/2013
(Continued)

*Primary Examiner* — Sm A Rahman
(74) *Attorney, Agent, or Firm* — Fox Rothschild LLP

(57) ABSTRACT

The present disclosure related to managing a data license in a machine-to-machine (M2M) system, and a method for operating a first device may include generating a first resource including data and a second resource including information for managing a license of the data, receiving a message for requesting an operation for the data from a second device, determining, based on the information in the second resource, whether the operation is permitted, and transmitting a second message for performing the operation to the second device or a third device.

15 Claims, 10 Drawing Sheets

(56) References Cited

U.S. PATENT DOCUMENTS

2018/0167397 A1      6/2018  Zhang
2021/0034716 A1*     2/2021  Sato .................. G06Q 10/0631
2021/0203731 A1*     7/2021  Garty ..................... H04L 67/51

FOREIGN PATENT DOCUMENTS

| KR | 10-2016-0091314 A |   | 8/2016 | |
| KR | 10-2017-0053130 A |   | 5/2017 | |
| KR | 20170053130 A | * | 5/2017 | ............ H04L 63/08 |
| WO | 2015/080515 A1 |   | 6/2015 | |

* cited by examiner

METHOD AND DEVICE FOR MANAGING DATA LICENSE IN M2M SYSTEM

CROSS-REFERENCE TO RELATED APPLICATIONS

The present application is a U.S. National Phase application under 35 U.S.C. § 371 of International Application No. PCT/KR2022/005299 filed on Apr. 12, 2022, which claims under 35 U.S.C. § 119 (e) the benefit of U.S. Provisional Application Ser. No. 63/189,279 filed on May 17, 2021, the entire contents of which are incorporated by reference herein.

BACKGROUND

(a) Technical Field

The present disclosure relates to a machine-to-machine (M2M) system, more particularly, to a method and apparatus for managing a data license in an M2M system.

(b) Description of the Related Art

Recently, Machine-to-Machine (M2M) systems have been introduced. An M2M communication may refer to a communication performed between machines without human intervention. M2M includes Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the one M2M standardization organization provides requirements for M2M communication, things to things communication and IoT technology, and technologies for architecture, Application Program Interface (API) specifications, security solutions and interoperability. The specifications of the one M2M standardization organization provide a framework to support a variety of applications and services such as smart cities, smart grids, connected cars, home automation, security and health.

SUMMARY

The present disclosure is directed to a method and apparatus for effectively managing a license for data in a machine-to-machine (M2M) system.

The present disclosure is directed to a method and apparatus for checking correct usage of a license for data in an M2M system.

The present disclosure is directed to a method and apparatus for checking an eligible operation for data in an M2M system.

The present disclosure is directed to a method and apparatus for copying data between platforms based on a license in an M2M system.

According to one embodiment of the present disclosure, a method for operating a first device in a machine-to-machine (M2M) system may include generating a first resource including data and a second resource including information for managing a license of the data, receiving a message for requesting an operation for the data from a second device, determining, based on the information in the second resource, whether the operation is permitted, and transmitting a second message for performing the operation to the second device or a third device.

According to one embodiment of the present disclosure, a method for operating a third device in a machine-to-machine (M2M) system may include receiving a first message for requesting to generate a first resource for data with a license from a first device or a second device, generating the first resource including the data and a second resource including information for managing the license, and transmitting a second message for notifying generation of the first resource and the second resource to the first device or the second device.

According to one embodiment of the present disclosure, a first device in a machine-to-machine (M2M) system may include a transceiver and a processor coupled with the transceiver, and the processor may be configured to generate a first resource including data and a second resource including information for managing a license of the data, receive a message for requesting an operation for the data from a second device, determine, based on the information in the second resource, whether the operation is permitted, and send a second message for performing the operation to the second device or a third device.

According to one embodiment of the present disclosure, a third device in a machine-to-machine (M2M) system may include a transceiver and a processor coupled with the transceiver, and the processor may be configured to receive a first message for requesting to generate a first resource for data with a license from a first device or a second device, generate the first resource including the data and a second resource including information for managing the license, and send a second message for notifying generation of the first resource and the second resource to the first device or the second device.

According to the present disclosure, a license for data in a machine-to-machine (M2M) system may be effectively managed.

Effects obtained in the present disclosure are not limited to the above-mentioned effects, and other effects not mentioned above may be clearly understood by those skilled in the art from the following description.

DETAILED DESCRIPTION

Figure 1:
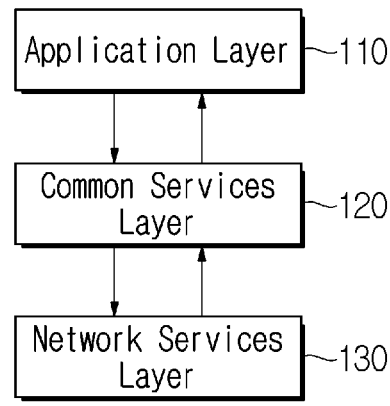
FIG. 1 illustrates a layered structure of a machine-to-machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present disclosure relates to a method and apparatus for managing a license for data in a machine-to-machine (M2M) system. More specifically, the present disclosure describes a technique of managing license information by using a RESTful-based API in an M2M system unlike the conventional passive license management.

one M2M is a de facto standards organization that was founded to develop a communal IoT service platform sharing and integrating application service infrastructure (platform) environments beyond fragmented service platform development structures limited to separate industries like energy, transportation, national defense and public service. .one M2M aims to render requirements for things to things communication and IoT technology, architectures, Application Program Interface (API) specifications, security solutions and interoperability. For example, the specifications of one M2M provide a framework to support a variety of applications and services such as smart cities, smart grids, connected cars, home automation, security and health. In this regard, one M2M has developed a set of standards defining a single horizontal platform for data exchange and sharing among all the applications. Applications across different industrial sections may also be considered by one M2M. Like an operating system, one M2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of one M2M), other CSEs and base networks (for example, network service entities or NSEs in the terminology of one M2M). The network services layer 130 may provide the common services layer 120 with services such as device management, location service and device triggering. Herein, an entity operating based on the network layer 120 may be a network service entity (NSE).

Figure 2:
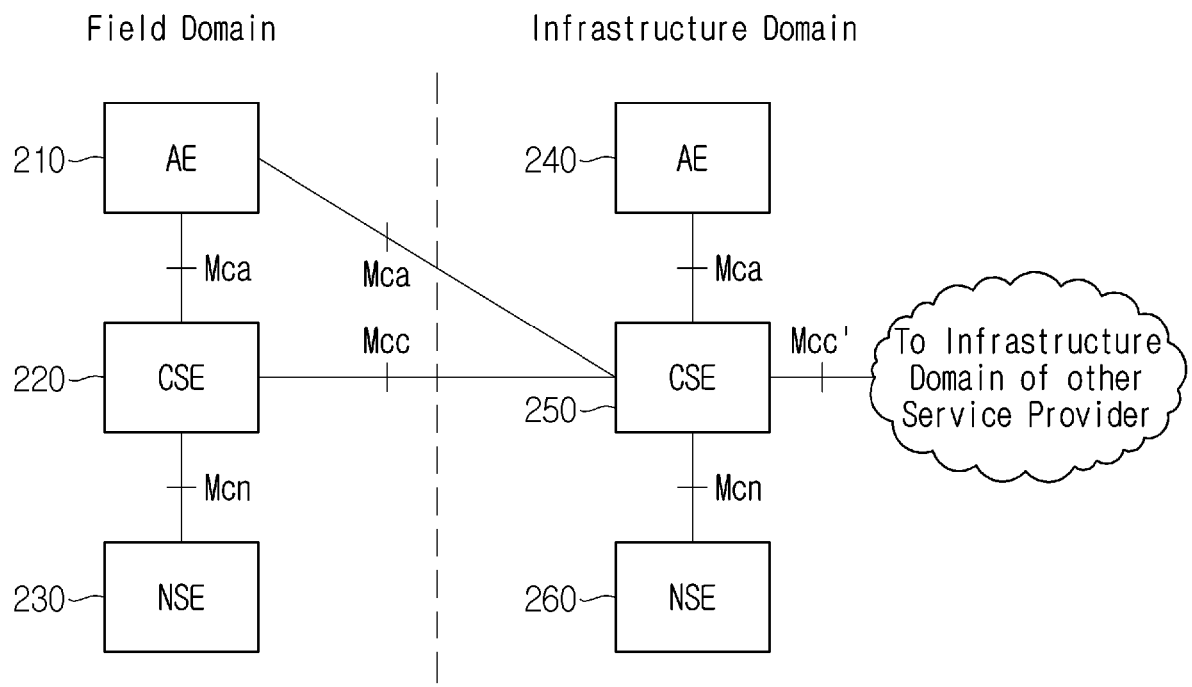
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
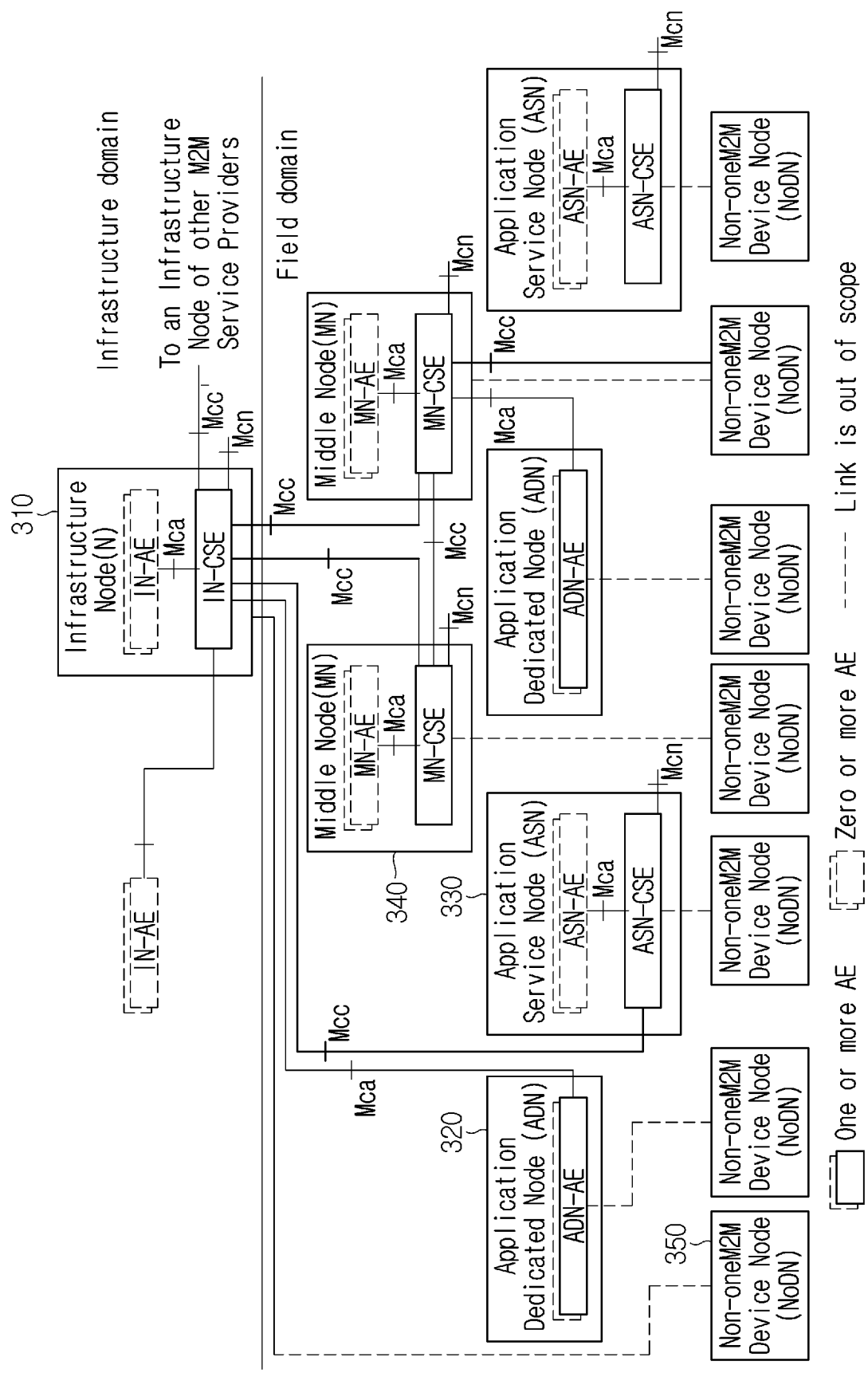
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
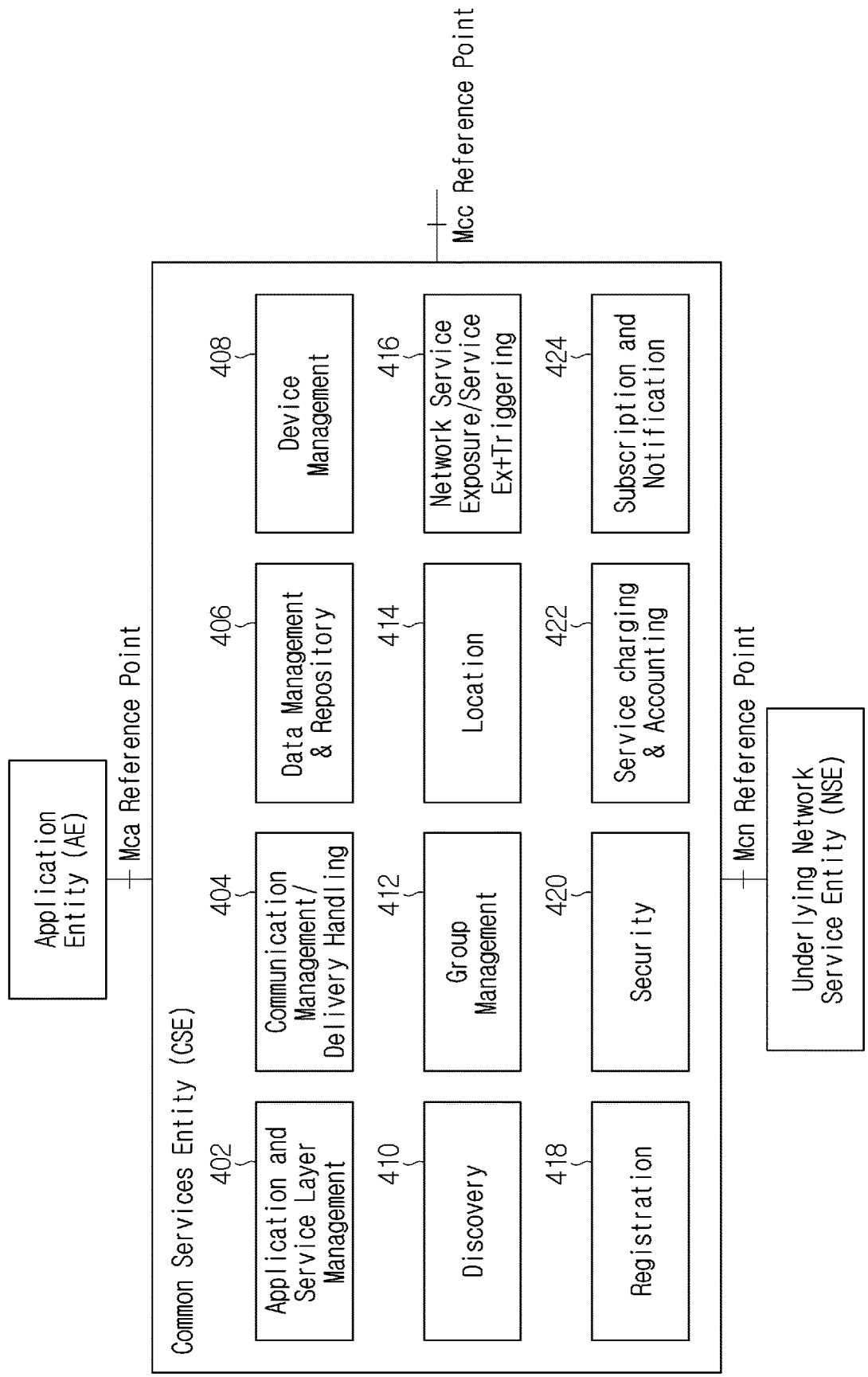
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
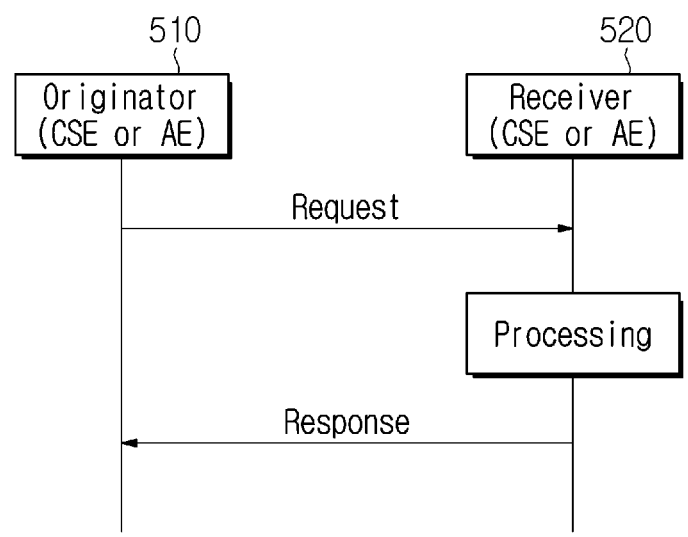
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
|---|
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Timestamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which can be used in a request message or a response message, may be defined as in Table 2 and Table 3 below.

TABLE 2

| Condition tag | Multi-plicity | Description |
|---|---|---|
| | | Matching Conditions |
| createdBefore | 0 . . . 1 | The creationTime attribute of the matched resource is chronologically before the specified value. |

TABLE 2-continued

| Condition tag | Multi-plicity | Description |
|---|---|---|
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator=Sam", "creator=Sam*", "creator =* Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multi-plicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |

TABLE 4-continued

| Request message parameter |
| --- |
| Authorization Signature - for use in Authorization Relationship Mapping |
| Authorization Relationship Indicator - for use in Authorization Relationship Mapping |
| Semantic Query Indicator - for use in semantic queries |
| Release Version Indicator - the oneM2M release version that this request message conforms to. |
| Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

There may be various ways to support management of a license for data (Hereinafter, referred to as 'data license'). The present disclosure relates to a case where a complex management mechanism is required to manage various types of information associated with data license management. For example, when a dataset is published, a license is applied to the dataset. A license is composed of various pieces of information operating as a holder's official permission for others to use or own something. For example, others need to correctly know how to use a shared or available dataset. Even when a system does not provide a means to control data, information in a license technique is useful when others need to use a dataset. Accordingly, the present disclosure proposes a new resource having information necessary to describe a license technique.

In an existing system, the following operations are not possible. Adding data license information to data or a dataset, checking whether copied data are properly following a given data license, exchanging data license information between platforms when data are shared, and the like are not supported. Accordingly, the present disclosure proposes a technique of adding various functions for supporting data license management in an IoT platform.

one M2M uses a representational state transfer (RESTful) architecture. An API request to perform an operation for a resource. Herein, the operation includes creation, retrieval, update, and deletion. CSEs are not capable of determining whether to use a resource access based on a license. CSEs need a specific rule indication for each resource, for example, regarding which license is related to the resource, what is a resource term, what is permitted, and the like.

To describe a license technique, it is necessary to know which type of information is needed. Data license management requires various information to support proper license management. Such information may be modeled as a resource named <dataLicenseMgt>. A resource to be managed according to a specific license technique may be associated with the <dataLicenseMgt> resource implementing the specific license technique. The <dataLicenseMgt> resource may be used for the purpose of consent and to store relevant information. One example of the <dataLicenseMgt> resource may be described as in FIG. 6 below.

Figure 6:
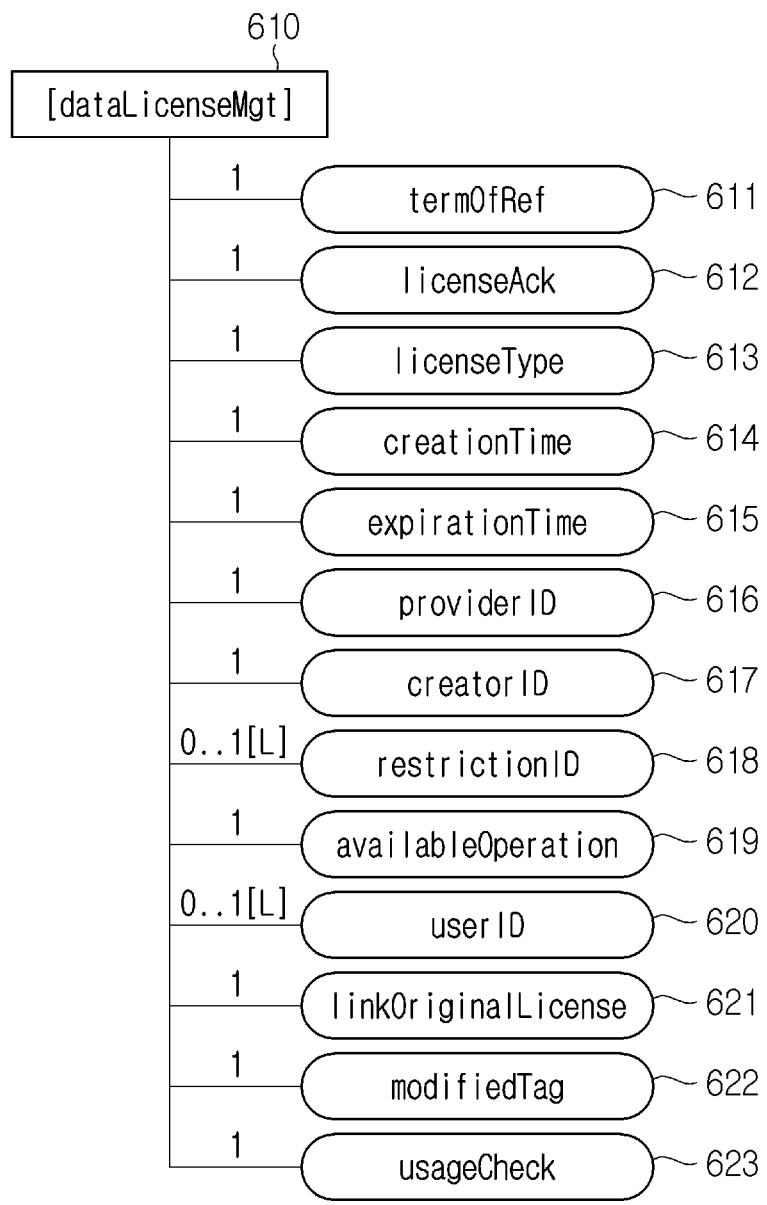
FIG. 6 illustrates an example of a resource for managing a license for data in an M2M system according to the present disclosure.

FIG. 6 illustrates an example of a resource for managing a license for data in an M2M system according to the present disclosure. Referring to FIG. 6, a resource for managing a license, for example, the <dataLicenseMgt> resource may include at least one of 'termOfRef' attribute 611, 'licenseAck' attribute 612, 'licenseType' attribute 613, 'creationTime' attribute 614, expirationTime' attribute 615, providerID' attribute 616, 'creatorID' attribute 617, 'restrictionID' attribute 618, 'availableOperation' attribute 619, 'userID' attribute 620, 'linkOriginalLicense' attribute 621, 'modifiedTag' attribute 622, and 'usageCheck' attribute 623. Each of the attributes listed above may be described as in Table 5 below.

TABLE 5

| Attribute | Description |
| --- | --- |
| termOfRef | Terms of data license. A header or copyright statement that comes with data. |
| licenseAck | Acknowledgment (ACK) for a source of data. An attribute statement specified by an information provider is included. If possible, a link to the license is provided. |
| licenseType | Types of data licenses. It indicates which type of a data license is applied. |
| creationTime | Creation date of a data license. It indicates when the data license is created. |
| expirationTime | Expiration of a data license. It indicates when the data license expires. |

TABLE 5-continued

| Attribute | Description |
|---|---|
| providerID | It indicates the provider of data. |
| creatorID | It indicates the creator of data. |
| restrictionID | Eligibility of using data. If the provider of data wants to limit the use of data to specific users or groups, such information may be included in this attribute. |
| availableOperation | Available operations. It provides information about what kinds of operations are available for a given dataset. Available options are modify, copy, publish to public, translate, adapt, and distribute. |
| userID | Users of data. It includes information regarding which platforms or users have used the data. |
| linkOriginalLicense | Original source of a data license. It indicates a link to the original license. |
| modifiedTag | Modification of data. It indicates whether the data is modified. |
| usageCheck | Usage check. It indicates whether the usage check is needed. |

According to one embodiment, at least one of the attributes listed in Table 5 may be included in the <dataLicenseMgt> resource. According to another embodiment, the <dataLicenseMgt> resource may include an attribute associated with an original source of data indicating a link to the original dataset in replacement of or addition to at least one of the attributes listed in Table 5.

Figure 7:
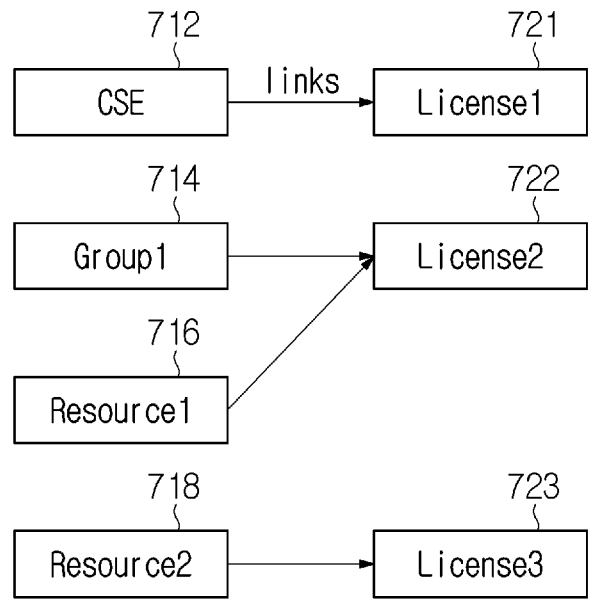
FIG. 7 illustrates an example of link relations among licenses and resources in an M2M system according to the present disclosure.

FIG. 7 illustrates an example of link relations among licenses and resources in an M2M system according to the present disclosure. Referring to FIG. 7, there may be three licenses 721, 722, and 723. The three licenses 721, 722 and 723 may each have a link to a user, a group, a resource, and the like. Specifically, the license 1 721 may have a link to a CSE 712, the license 2 722 may have a link to a group 1 714 and a resource 1 716, and the license 3 723 may have a link to a resource 2 718. In order for the group 1 714, the resource 1 716, and the resource 2 718 of an M2M platform to have a link to a license, a resource associated with management of a data license, for example, the <dataLicenseMgt> resource should be available.

Figure 8:
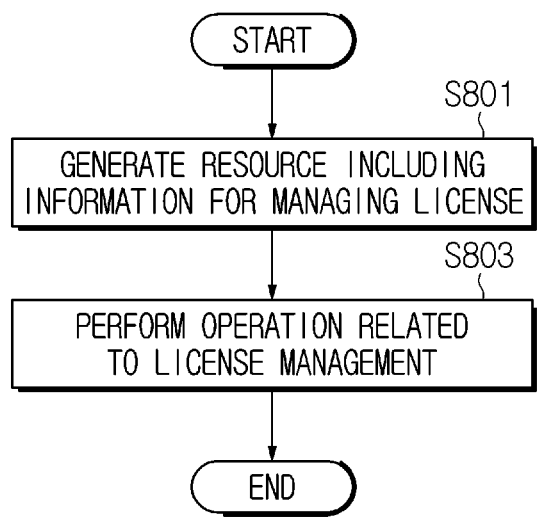
FIG. 8 illustrates an example of a procedure of processing data based on a license-related resource in an M2M system according to the present disclosure.

FIG. 8 illustrates an example of a procedure of processing data based on a license-related resource in an M2M system according to the present disclosure. The operation subject of FIG. 8 may be a device executing an application or a CSE operating based on a data license. Hereinafter, the operation subject of FIG. 8 will be referred to as 'device'.

Referring to FIG. 8, at step S801, the device generates a resource including information for managing a license. In other words, the device generates a resource including at least one attribute associated with a license. The resource including information for managing a license is associated with a resource including data under the license. That is, the device may generate a resource including data and then generate a resource including information for managing a license of the data. Herein, the generation of a resource may be performed in the device or another device. That is, generating a resource at this step may be understood as an operation of the device for generating the resource on its own or an operation of the device for requesting another device to generate the resource. For example, the information for managing the license may include at least one of information on the contents of the license, information on an operation permitted by the license, information on validity of the license, information on a usage history of the data, and information on checking of the license.

At step S803, the device performs an operation related to license management. The operation related to license management may be understood as an operation of checking whether a subject having an eligible license is accessing data with a license for an eligible operation, when the subject wants to use the data. For example, when performing an operation for discovery, retrieval, modification, copy, and publishing for data with a license or receiving a request to perform the operation, the device may first check whether an operating subject has a proper license and then perform or assist the operation. Alternatively, the device may perform an operation for data with a license and then check or confirm whether information on the license is correctly stored.

According to the above-described embodiments, an operation(s) associated with data with a license may be performed based on information on data licenses. Some use cases are as follows. According to one embodiment, correct usage of a data license may be checked. After a set of data is copied to another platform, the correct usage of the dataset may be checked. A source platform may use a retrieval request to get ACK, a source of data, and a data license.

According to one embodiment, it may be checked whether an operation is an eligible operation for data. Whenever an application tries to use data (for example, to copy or share data to or with another application), the platform may check whether the operation is an available operation for the data based on a given data license. When the operation requested from the application is not included in available operations, the request will be rejected.

According to one embodiment, automatic validation may be performed. After a set of data is copied to another platform to be used for IoT services, the source platform may automatically check the correct usage or configuration of the target platform. At the end of a copy or exchange process, there may be extra steps where the source platform performs checking with the target platform. The extra steps may retrieve ACK, a proper eligible operation, a source link, and the like from the target platform. If such information is not properly configured, the operation will be canceled.

Figure 9:
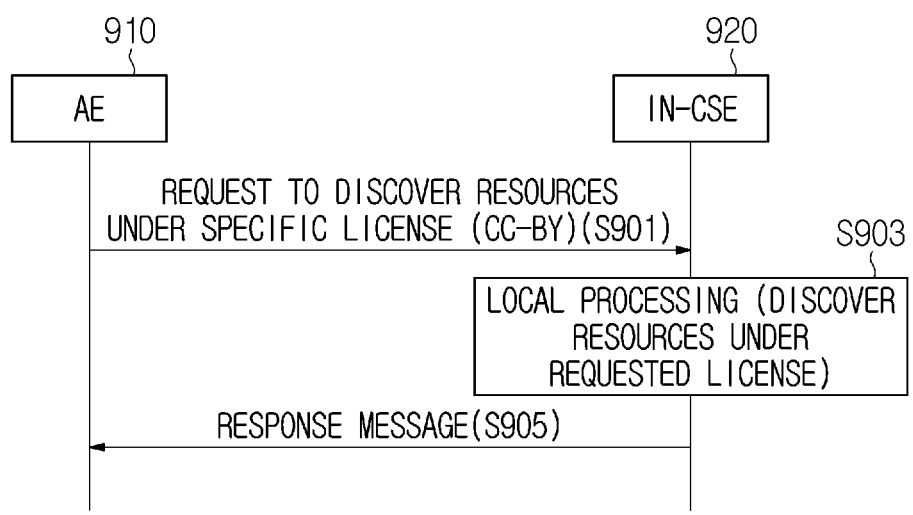
FIG. 9 illustrates an example of a procedure of discovering a resource based on a license-related resource in an M2M system according to the present disclosure.

FIG. 9 illustrates an example of a procedure of discovering a resource based on a license-related resource in an M2M system according to the present disclosure. FIG. 9 exemplifies signal exchange between an AE 910 and an IN-CSE 920. In FIG. 9, the AE 910 wants to discover a specific resource.

Referring to FIG. 9, at step S901, the AE 910 requests the IN-CSE 920 to discover resources under a specific license. In other words, the AE 910 requests information on resources associated with a specific license. To this end, the AE 910 sends a request message including a license grade (for example, CC-BY) used for discovery.

At step S903, the IN-CSE 920 processes local processing for the requested discovery. For example, the IN-CSE 920 identifies resources under a license indicated by the request message received at step S901. In other words, the IN-CSE 920 identifies at least one resource including data under the requested license grade (for example, CC-BY). Herein, CC-BY is a grade demanding that an original author should be marked when a work is used. Herein, according to one embodiment, the IN-CSE 920 may determine whether the discovery operation of the AE 910 is permitted, based on information in a resource for managing a license associated with the identified resource. For example, when an attribute for usage check is configured as a positive value (for example, 1) in the resource for managing a license, the IN-CSE 920 may determine whether the discovery operation is permitted based on information on a permitted operation (for example, availableOperation).

At step S905, the IN-CSE 920 sends a response message to the AE 910. The response message includes information on resources associated with a specific license requested by the AE 910. For example, the information on the resources is information necessary to access a resource and may include an address of a resource, a list of resources, and the like.

As in the embodiment described with reference to FIG. 9, a license-based discovery procedure may be performed. The procedure exemplified in FIG. 9 enables resources to be discovered based on a specific license. For example, an IoT application, which wants to provide a service showing weather forecasts based on available open sensor data under CC0, may discover a resource having weather sensor data under CC0. Herein, CC0 means a grade that allows anyone to do anything by using a given dataset without mentioning a provider or holder of a dataset.

Figure 10:
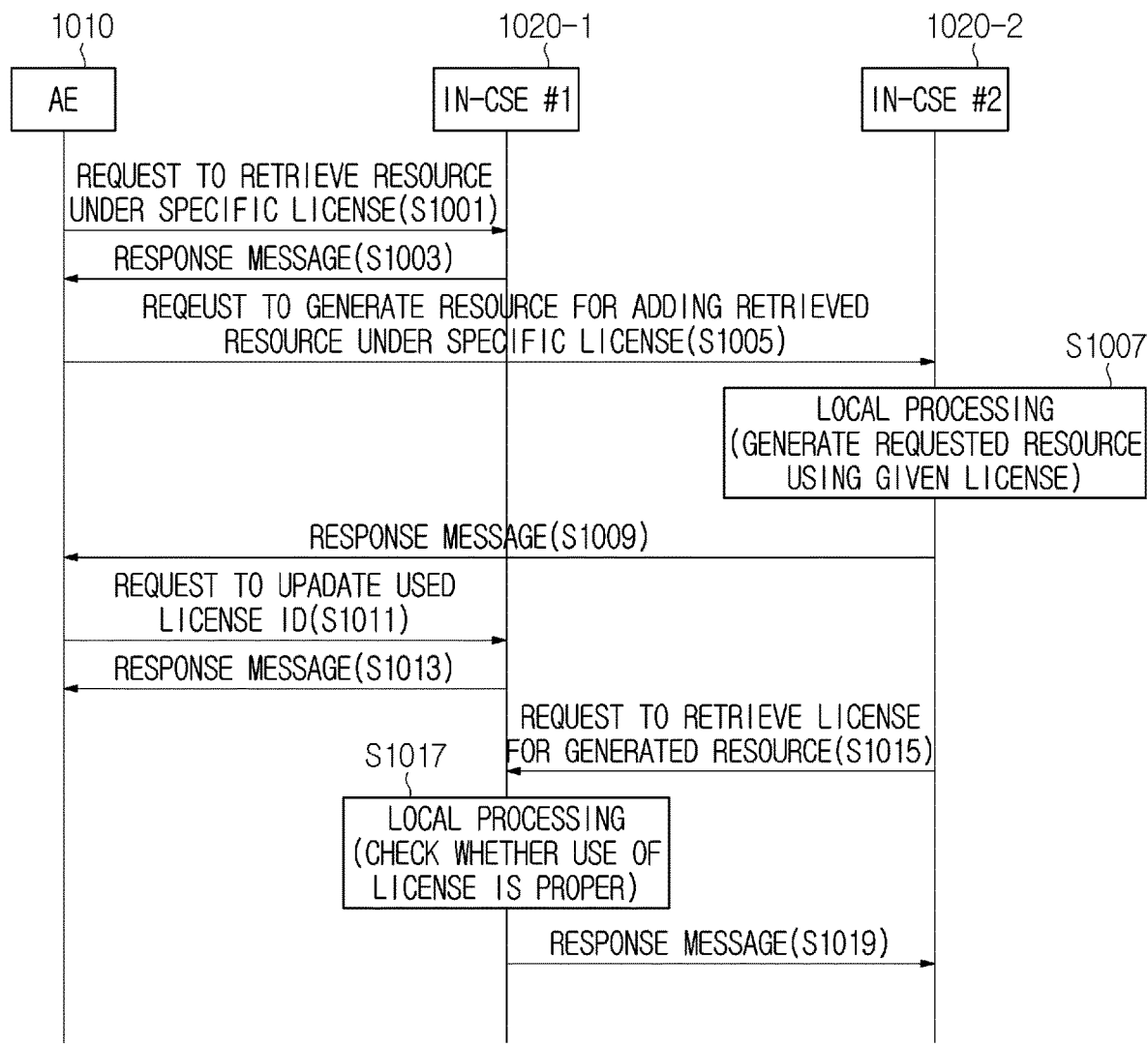
FIG. 10 illustrates an example of a procedure of retrieving a resource based on a license-related resource in an M2M system according to the present disclosure.

FIG. 10 illustrates an example of a procedure of retrieving a resource based on a license-related resource in an M2M system according to the present disclosure. FIG. 10 illustrates signal exchange among an AE 1010, an IN-CSE #1 1020-1, and an IN-CSE #2 1020-2. In FIG. 10, the AE 1010 is an originator for generating a resource, the IN-CSE #1 1020-1 hosts an original resource, and the IN-CSE #2 1020-2 is associated with an AE (for example, a web interface) that consumes data.

Referring to FIG. 10, at step S1001, the AE 1010 requests to retrieve a resource under a specific license. In other words, the AE 1010 requests data included in the resource associated with the specific license. To this end, the AE 1010 sends a request message including information indicating a resource for retrieval. Herein, the resource may be indicated by the specific license or indicated by identification information for the resource.

At step S1003, the IN-CSE #1 1020-1 sends a response message to the AE 1010. The response message is sent as a response to the request of step S1001. The response message includes information on the resource requested by the AE 1010. That is, the IN-CSE #1 1020-1 may identify the resource indicated by the request message received at step S1001 and send the response message including data included in the resource. Accordingly, the AE 1010 may acquire the data included in the requested resource. Herein, according to one embodiment, the IN-CSE #1 1020-1 may determine whether a retrieval operation of the AE 1010 is permitted, based on information in a resource for managing a license associated with the requested resource. For example, when an attribute (for example, usageCheck) for usage check is configured as a positive value (for example, 1) in the resource for managing a license, the IN-CSE #1 1020-1 may determine whether the retrieval operation is permitted based on information on a permitted operation (for example, availableOperation).

At step S1005, the AE 1010 requests the IN-CSE #2 1020-2 to generate a resource for adding a retrieved resource under the specific license. The AE 1010 starts operations for transferring a resource acquired from the IN-CSE #1 1020-1 to the IN-CSE #2 1020-2. That is, the AE 1010 requests to generate a resource under the specific license. To this end, the AE 1010 may send a request message including information on the resource under the specific license and information on the specific license to the IN-CSE #2 1020-2.

At step S1007, the IN-CSE #2 1020-2 generates the requested resource by using a given license. That is, the IN-CSE #2 1020-2 generates at least one resource and adds information on the given license to the at least one generated resource. In other words, the IN-CSE #2 1120-2 generates at least one resource according to a request of the IN-CSE #1 1120-1 and stores license-related information in the at least one generated resource. Herein, the license-related information may indicate that the resource follows the specific license indicated at step S1005. For example, the CSE #2 1120-2 may generate a requested resource and generate a resource associated with a license responding to the requested resource.

At step S1009, the IN-CSE #2 1020-2 sends a response message to the AE 1010. The response message is sent as a response to the request of step S1005. The response message may include at least one of information associated with generation of requested resources and information on a generated resource. Accordingly, the AE 1010 may confirm that a requested resource is generated in the IN-CSE #2 1020-2.

At step S1011, the AE 1010 requests the IN-CSE #1 1020-1 to update a used license ID. To this end, the AE 1010 may send a request message including information on a new used license ID. Herein, the license ID is information indicating a platform or a user capable of using data included in a corresponding resource and may correspond to userID in Table 5. As the AE 1010 generates a resource under a specific license in the IN-CSE #2 1020-2, the AE 1010 may request to update the license ID so that the use of the data by the IN-CSE #2 1020-2 may be recorded in a resource stored in the IN-CSE #1 1020-1.

At step S1013, the IN-CSE #1 1020-1 sends a response message to the AE 1010. The response message is sent as a response to the request of step S1011. That is, the IN-CSE #1 1020-1 may update the license ID according to the request message of step S1011 and then send a response notifying the completion of update.

At step S1015, the IN-CSE #2 1020-2 requests the IN-CSE #1 1020-1 to retrieve a license for the generated resource. The IN-CSE #2 1020-2 may request the license-related information to check whether the license-related information included in the resource generated at step S1007 is correct, for example, whether the license is the same as an original one stored in the IN-CSE #1 1020-1. To this end, the IN-CSE #2 1020-2 may send a request message including at least one of information on the generated resource and information on a license in the generated resource. Herein, according to one embodiment, after the IN-CSE #2 1020-2 confirms that the IN-CSE #1 1020-1 has an original license, based on information on a source (for example, linkOirginalLicense) of the original license included in a resource for managing a license associated with a generated resource, the IN-CSE #2 1020-2 may send the request message to the IN-CSE #1 1020-1.

At step S1017, the IN-CSE #1 1020-1 checks whether a proper license is used. That is, the IN-CSE #1 1020-1 may check whether an operation of the IN-CSE #2 1020-2 to generate a resource including the data violates the license. To this end, the IN-CSE #1 1020-1 may determine whether the operation of the IN-CSE #2 1020-2 is included in the use of a proper license, based on information in the resource identified in response to the request of step S1001 (for example, information on an available operation, information on a constraint on the use of data, and the like).

At step S1019, the IN-CSE #1 1020-1 sends a response message to the IN-CSE #2 1020-2. The response message is sent as a response to the request of step S1015. For example, the response message may include information notifying whether the operation of the IN-CSE #2 1020-2 is included in the use of the proper license. That is, the IN-CSE #1 1020-1 sends a response including the response to the request of step S1015.

Figure 11:
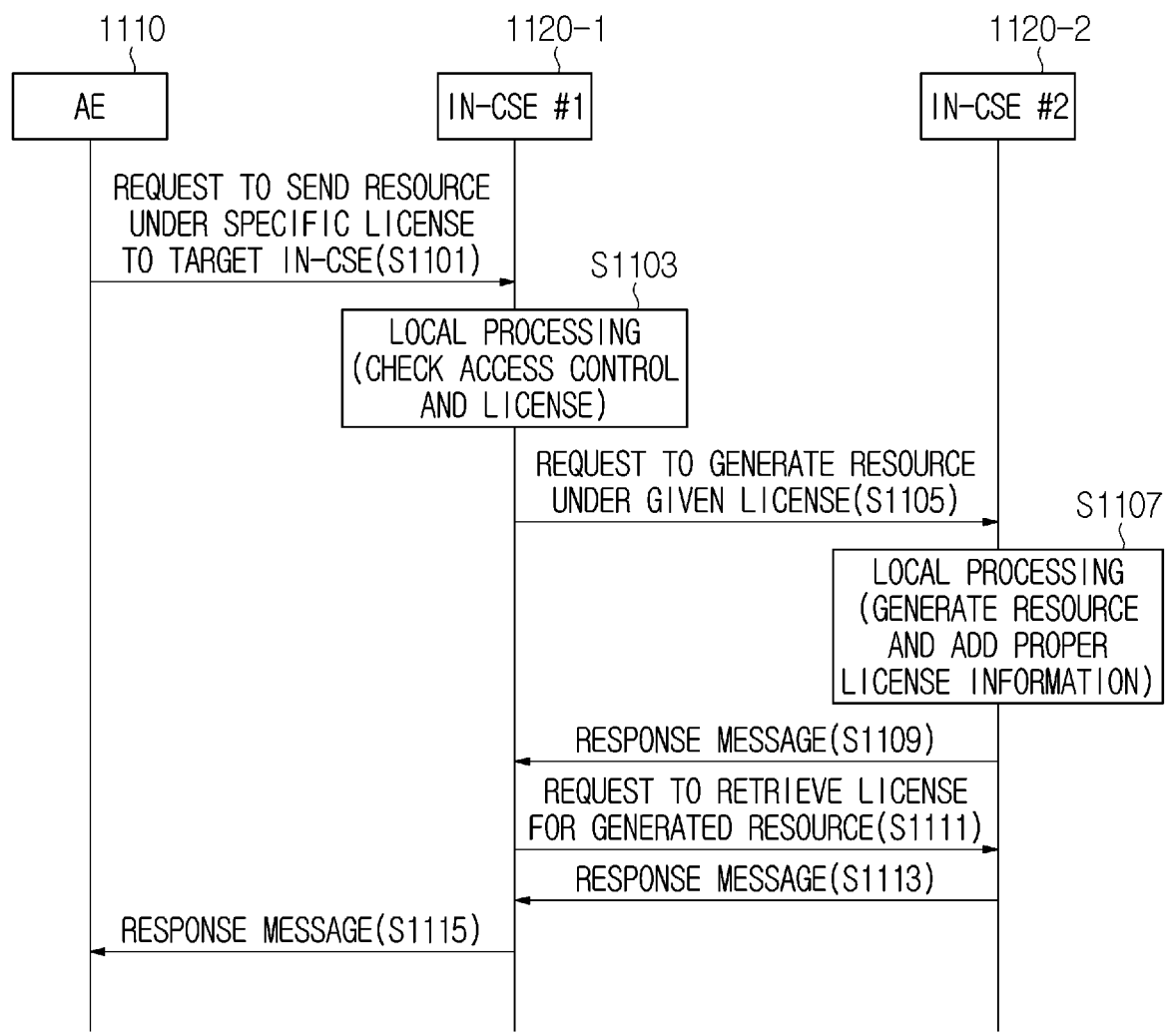
FIG. 11 illustrates an example of a procedure of transferring a resource based on a license-related resource in an M2M system according to the present disclosure.

FIG. 11 illustrates an example of a procedure of transferring a resource based on a license-related resource in an M2M system according to the present disclosure. FIG. 11 illustrates signal exchange among an AE 1110, an IN-CSE #1 1120-1, and an IN-CSE #2 1120-2. In FIG. 11, the AE 1110 is an originator for generating a resource, the IN-CSE #1 1120-1 hosts an original resource, and the IN-CSE #2 1120-2 is associated with an AE (for example, a web interface) that consumes data.

Referring to FIG. 11, at step S1101, the AE 1110 requests the IN-CSE #1 1120-1 to send a resource under a specific license to a target IN-CSE (for example, IN-CSE #2 1120-2). That is, the AE 1110 requests to transfer at least one resource under a specific license stored in the IN-CSE #1 1120-1 to the IN-CSE #2 1120-2. In other words, the AE 1110 requests to copy a resource stored in the IN-CSE #1120-1 into the IN-CSE #2 1120-2. To this end, the AE 1110 may send a request message including information indicating the specific license.

At step S1103, the IN-CSE #1 1120-1 identifies an access control policy and the license. That is, the IN-CSE #1 1120-1 identifies at least one resource under the specific license and identifies the access control policy of the at least one identified resource and the license. In other words, the IN-CSE #1 1120-1 may check whether the transfer of the at least one identified resource to another platform violates the access control policy and the license, and if permitted, what a condition is. Herein, according to one embodiment, the IN-CSE #1 1120-1 may determine whether a copy operation requested by the AE 1110 is permitted, based on information in a resource for managing the license associated with the requested resource. For example, when an attribute (for example, usageCheck) for usage check is configured as a positive value (for example, 1) in the resource for managing a license, the IN-CSE #1 1120-1 may determine whether the retrieval operation is permitted based on information on a permitted operation (for example, availableOperation).

At step S1105, the IN-CSE #1 1120-1 requests the IN-CSE #2 1120-2 to generate resources under the given license. Herein, the given license means a license grade indicated by the AE 1110. To this end, the IN-CSE #1 1120-1 may send a request message including information indicating the given license.

At step S1107, the IN-CSE #2 1120-2 generates resources and adds information on a proper license. That is, the IN-CSE #2 1120-2 generates at least one resource according to a request of the IN-CSE #1 1120-1 and stores license-related information in the at least one generated resource. Herein, the license-related information may indicate that the resource follows the license grade indicated at step S1105.

At step S1109, the IN-CSE #2 1120-2 sends a response message to the IN-CSE #1 1120-1. Herein, the response message is sent as a response to the request of step S1105. The response message may include at least one of information associated with generation of requested resources and information on a generated resource. Accordingly, the IN-CSE #1 1120-1 may confirm that the requested resources are generated in the IN-CSE #2 1120-2.

At step S1111, the IN-CSE #1 1120-1 requests the IN-CSE #2 1120-2 to retrieve a license for the generated resource. That is, to check whether a license is properly specified, the IN-CSE #1 1120-1 may send a request message for requesting to retrieve license-related information stored in the at least one resource generated at step S1107. In other words, the IN-CSE #1 1120-1 may request license-related information stored by the CSE #2 1120-2 to the IN-CSE #2 1120-2 in order to check the license-related information included in the generated resource is the same as license-related information of an original resource stored in the IN-CSE #1 1120-1. To this end, the IN-CSE #1 1120-1 may send a request message including information indicating at least one generated resource. Herein, according to one embodiment, when an attribute (for example, usageCheck) for usage check is configured as a positive value in a resource for managing a license, the IN-CSE #1 1120-1 may send the request message to identify the license-related information stored in the IN-CSE #2 1120-2.

At step S1113, the IN-CSE #2 1120-2 sends a response message to the IN-CSE #1 1120-1. Herein, the response message is sent as a response to the request of step S1111. The response message may include license-related information included in at least one resource thus requested. Accordingly, the IN-CSE #1 1120-1 may identify license information of the at least one resource.

At step S1115, the IN-CSE #1 1120-1 sends a response message to the AE 1110. Herein, the response message is sent as a response to the request of step S1101. The response message may include information notifying that the transfer of the requested resource is completed. In addition, the response message may include information notifying that a license of the requested resource is properly configured in the target platform. Accordingly, the AE 1110 may confirm that the at least one resource has been successfully transferred together with the correct license.

As in the embodiment described with reference to FIG. 11, a license-based resource transfer procedure and checking procedure may be performed. Specifically, as a use case of using a license, a source IN-CSE may transfer a set of discovered resources to a target IN-CSE and check a license. When a set of open data is shared with others and there is an IoT application that wants to use the dataset, the IoT application downloads or retrieve the dataset and stores the downloaded dataset in its IoT platform. Next, data transfer needs to be supported according to specific licenses. Additionally, the source IN-CSE needs to check whether the target IN-CSE has properly stored the transferred dataset based on guidance described in a license technique.

Figure 12:
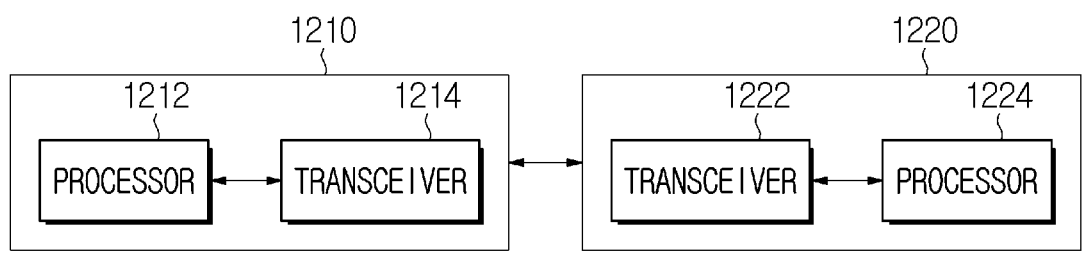
FIG. 12 illustrates a configuration of an M2M device in an M2M system according to the present disclosure.

FIG. 12 illustrates a configuration of an M2M device in an M2M system according to the present disclosure. An M2M device 1210 or an M2M device 1220 illustrated in FIG. 12 may be understood as hardware functioning as at least one among the above-described AE, CSE and NSE.

Referring to FIG. 12, the M2M device 1210 may include a processor 1212 controlling a device and a transceiver 1214 transmitting and receiving a signal. Herein, the processor 1212 may control the transceiver 1214. In addition, the M2M device 1210 may communicate with another M2M device 1220. The another M2M device 1220 may also include a processor 1222 and a transceiver 1224, and the processor 1222 and the transceiver 1224 may perform the same function as the processor 1212 and the transceiver 1214.

As an example, the originator, the receiver, AE and CSE, which are described above, may be one of the M2M devices 1210 and 1220 of FIG. 12, respectively. In addition, the devices 1210 and 1220 of FIG. 12 may be other devices. As an example, the devices 1210 and 1220 of FIG. 12 may be communication devices, vehicles, or base stations. That is, the devices 1210 and 1220 of FIG. 12 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a first device in a machine-to-machine (M2M) system, the method comprising:
   generating a first resource including data and a second resource including information for managing a license of the data;
   receiving a message for requesting an operation for the data from a second device;
   determining, based on the information in the second resource, whether the operation is permitted;
   transmitting a second message for performing the operation to the second device or a third device; and
   transmitting, to the third device, a request for retrieving information on the license stored in the third device based on the information for managing the license.

2. The method of claim 1, wherein the second resource includes at least one of information on a content of the license, information on an operation permitted by the license, information on validity of the license, information on usage history of the data, and information on checking of the license.

3. The method of claim 1, further comprising checking whether information on the license stored in the third device using information on the license by the operation is identical with an original license, when the second resource includes the information on the checking of the license configured as a positive value.

4. The method of claim 1, wherein the transmitting of the second message comprises transmitting the second message including information on the first resource to the second device.

5. The method of claim 1, wherein the transmitting of the second message comprises transmitting the second message including the information on the first resource and information on the license included in the second resource to the third device.

6. The method of claim 1, further comprising:
   receiving a third message for requesting to add information on the third device to the second resource; and
   adding the information on the third device as information on a platform or a user using the data included in the second resource.

7. A method for operating a third device in a machine-to-machine (M2M) system, the method comprising:
   receiving a first message for requesting to generate a first resource for data with a license from a first device or a second device;
   generating the first resource including the data and a second resource including information for managing the license;
   transmitting a second message for notifying generation of the first resource and the second resource to the first device or the second device; and
   receiving, from the first device, a request for retrieving information on the license stored in the third device based on the information for managing the license.

8. The method of claim 7, wherein the second resource includes at least one of information on a content of the license, information on an operation permitted by the license, information on validity of the license, information on usage history of the data, and information on checking of the license.

9. The method of claim 7, further comprising receiving, from the first device, a third message for checking whether information on the license stored in the third device is identical with an original license, when the second resource includes the information on the checking of the license configured as a positive value.

10. The method of claim 7, further comprising receiving, from the first device, the third message for requesting the information on the license stored in the third device, when the second resource includes the information on the checking of the license configured as a positive value.

11. A first device in a machine-to-machine (M2M) system, comprising:
- a transceiver; and
- a processor coupled with the transceiver,
- wherein the processor is configured to:
  - generate a first resource including data and a second resource including information for managing a license of the data,
  - receive a message for requesting an operation for the data from a second device,
  - determine, based on the information in the second resource, whether the operation is permitted,
  - send a second message for performing the operation to the second device or a third device, and
  - transmit, to the third device, a request for retrieving information on the license stored in the third device based on the information for managing the license.

12. The first device of claim 11, wherein the processor is further configured to check whether information on the license stored in the third device using information on the license by the operation is identical with an original license, when the second resource includes information on checking of the license configured as a positive value.

13. The first device of claim 11, wherein the processor is further configured to send the second message including information on the first resource to the second device.

14. The first device of claim 11, wherein the processor is further configured to send the second message including the information on the first resource and information on the license included in the second resource to the third device.

15. The first device of claim 11, wherein the processor is further configured to:
- receive a third message for requesting to add information on the third device to the second resource, and
- add the information on the third device as information on a platform or a user using the data included in the second resource.

* * * * *